(12) United States Patent
David et al.

(10) Patent No.: US 9,378,343 B1
(45) Date of Patent: *Jun. 28, 2016

(54) AUTOMATIC DETECTION OF REQUIRED NETWORK KEY TYPE

(75) Inventors: Ram Adva Fish David, Menlo Park, CA (US); Dilip Raghu Kenchammana-Hosekote, Menlo Park, CA (US)

(73) Assignee: Nokia Corporation, Espoo (FI)

( * ) Notice: Subject to any disclaimer, the term of this patent is extended or adjusted under 35 U.S.C. 154(b) by 970 days.

This patent is subject to a terminal disclaimer.

(21) Appl. No.: 11/820,456

(22) Filed: Jun. 18, 2007

Related U.S. Application Data

(60) Provisional application No. 60/814,172, filed on Jun. 16, 2006.

(51) Int. Cl.
*H04L 9/32* (2006.01)
*G06F 21/31* (2013.01)
*H04L 29/06* (2006.01)

(52) U.S. Cl.
CPC .............. *G06F 21/31* (2013.01); *H04L 63/08* (2013.01)

(58) Field of Classification Search
CPC ................................ G06F 21/31; H04L 63/08
USPC ............................ 726/2–7; 713/168; 380/270
See application file for complete search history.

(56) References Cited

U.S. PATENT DOCUMENTS

| | | | |
|---|---|---|---|
| 5,199,069 A * | 3/1993 | Barrett et al. | 380/28 |
| 5,284,784 A | 2/1994 | Manley | |
| 5,721,780 A * | 2/1998 | Ensor et al. | 713/155 |
| 5,915,220 A | 6/1999 | Chelliah | |
| 6,097,964 A | 8/2000 | Nuovo et al. | |
| 6,981,223 B2 | 12/2005 | Becker et al. | |
| 7,007,239 B1 | 2/2006 | Hawkins et al. | |
| 7,117,445 B2 | 10/2006 | Berger | |
| 7,187,935 B1 | 3/2007 | Day | |
| 7,224,973 B2 | 5/2007 | Tsutazawa et al. | |
| 7,421,270 B2 | 9/2008 | Serafat et al. | |
| 7,555,783 B2 * | 6/2009 | Enright | 726/27 |
| 2001/0023446 A1 * | 9/2001 | Balogh | 709/229 |
| 2002/0078150 A1 | 6/2002 | Thompson et al. | |
| 2002/0132610 A1 | 9/2002 | Chaplin et al. | |
| 2002/0152255 A1 | 10/2002 | Smith, Jr. et al. | |
| 2002/0176366 A1 * | 11/2002 | Ayyagari et al. | 370/245 |

(Continued)

FOREIGN PATENT DOCUMENTS

| | | | |
|---|---|---|---|
| JP | 2001357017 | * | 1/2001 |
| JP | 2004015077 | * | 1/2004 |

(Continued)

OTHER PUBLICATIONS

"Instant Messaging and Presence on the Internet", ISOC Member Briefing #9, Internet Society, Nov. 11, 2002, Harald Alvestrand, 8pp., http://www.isoc.org/briefings/009/.

(Continued)

*Primary Examiner* — Teshome Hailu
(74) *Attorney, Agent, or Firm* — Ditthavong & Steiner, P.C.

(57) ABSTRACT

Methods and apparatuses in automatic detection of a required network key type are described. In one embodiment, a client device prompts a user for a pass phrase, receives a pass phrase and automatically determines the encryption type for the pass phrase to connect to a network. The client device then communicates with a server to authenticate the client device.

14 Claims, 5 Drawing Sheets

(56) References Cited

U.S. PATENT DOCUMENTS

| | | | |
|---|---|---|---|
| 2002/0178365 A1* | 11/2002 | Yamaguchi | 713/182 |
| 2003/0054818 A1* | 3/2003 | Bahl et al. | 455/432 |
| 2003/0087663 A1 | 5/2003 | Finke-Anlauff | |
| 2003/0099362 A1* | 5/2003 | Rollins | 380/278 |
| 2003/0166405 A1 | 9/2003 | Jauk et al. | |
| 2003/0204748 A1* | 10/2003 | Chiu | 713/201 |
| 2004/0003042 A1 | 1/2004 | Horvitz et al. | |
| 2004/0053601 A1* | 3/2004 | Frank et al. | 455/411 |
| 2004/0071150 A1 | 4/2004 | Honkala et al. | |
| 2004/0078597 A1 | 4/2004 | Sun et al. | |
| 2004/0103156 A1 | 5/2004 | Quillen et al. | |
| 2004/0110543 A1 | 6/2004 | Mikan | |
| 2004/0203659 A1 | 10/2004 | Mikan | |
| 2004/0266489 A1 | 12/2004 | Chipchase et al. | |
| 2004/0268265 A1 | 12/2004 | Berger | |
| 2005/0125693 A1* | 6/2005 | Duplessis et al. | 713/201 |
| 2005/0147049 A1 | 7/2005 | Ganesan | |
| 2005/0163108 A1 | 7/2005 | Moore et al. | |
| 2005/0265546 A1* | 12/2005 | Suzuki | 380/44 |
| 2005/0268240 A1 | 12/2005 | Kankaanpaa | |
| 2005/0283729 A1 | 12/2005 | Morris et al. | |
| 2006/0031936 A1* | 2/2006 | Nelson et al. | 726/23 |
| 2006/0051050 A1 | 3/2006 | Ning | |
| 2006/0056613 A1 | 3/2006 | Kim et al. | |
| 2006/0059253 A1* | 3/2006 | Goodman et al. | 709/223 |
| 2006/0064719 A1 | 3/2006 | Youden | |
| 2006/0123347 A1 | 6/2006 | Hewitt et al. | |
| 2006/0135197 A1 | 6/2006 | Jin et al. | |
| 2006/0171537 A1* | 8/2006 | Enright | 380/270 |
| 2006/0209773 A1* | 9/2006 | Hundal et al. | 370/338 |
| 2006/0259474 A1 | 11/2006 | Granito | |
| 2006/0294465 A1 | 12/2006 | Ronen et al. | |
| 2007/0067738 A1 | 3/2007 | Flynt et al. | |
| 2007/0087775 A1 | 4/2007 | Richardson et al. | |
| 2007/0192410 A1 | 8/2007 | Liversidge et al. | |
| 2007/0211871 A1 | 9/2007 | Sjolander et al. | |
| 2007/0256025 A1 | 11/2007 | Yen et al. | |
| 2007/0266236 A1* | 11/2007 | Colditz | 713/153 |
| 2008/0013751 A1 | 1/2008 | Hiselius | |
| 2008/0043958 A1 | 2/2008 | May et al. | |
| 2008/0119217 A1 | 5/2008 | Coxhill | |
| 2008/0301737 A1 | 12/2008 | Hjelmeland Almas et al. | |
| 2009/0170479 A1 | 7/2009 | Jarenskog | |
| 2010/0082980 A1* | 4/2010 | Shiraki | 713/168 |

FOREIGN PATENT DOCUMENTS

| | | | |
|---|---|---|---|
| JP | 2006139471 | * | 6/2006 |
| WO | WO 2004028078 | * | 6/2004 |

OTHER PUBLICATIONS

"Messaging & Collaboration", "Microsoft Extending IM Presence, Interoperability", eWeek.com, 4pp., http://www.eweek.com/article2/0,1895,1493184,00. asp.

http://www.microsoft.com/technet/prodtechnol/ofifce/livecomm/library/como/gettingstartecl/ComoGS_4.mspx, "Microsoft Office Communicator Mobile Getting Started Guide", Viewing and Changing Presence Information, Microsoft TechNet, Apr. 1, 2006.

http://www.xmpp.org/rfcs/rfc3921.html, "Extensible Messaging and Presence Protocol (XMPP): Instant Messaging and Presence", Network Working Group, Request for Comments: 3921, Category: Standards Track, P. Saint-Andre, Ed., Jabber Software Foundation, Oct. 2004, RFC 3921, TOC, 84pp.

Nokia 6682 User Guide (May 4, 2005).

Office action for related U.S. Appl. No. 11/820,453 dated Jun. 25, 2010, pp. 1-33.

Office action for related U.S. Appl. No. 11/820,453 dated Dec. 10, 2010, pp. 1-36.

Office Action for related U.S. Appl. No. 11/820,783 dated Mar. 28, 2011, pp. 1-30.

Final Rejection for related U.S. Appl. No. 11/820,453 dated Jan. 10, 2012, pp. 1-34.

Office Action for related U.S. Appl. No. 11/820,783 dated Dec. 23, 2011, pp. 1-33.

Office action for related U.S. Appl. No. 11/820,453 dated Jul. 26, 2011, pp. 1-36.

Final Rejection for related U.S. Appl. No. 11/820,783 dated Oct. 18, 2012, pp. 1-33.

* cited by examiner

AUTOMATIC DETECTION OF REQUIRED NETWORK KEY TYPE

RELATED APPLICATIONS

This application claims priority to U.S. provisional patent application 60/814,172, titled "Method to Automatically Detect if WiFi Network Authentication Key Entered by User is a String or a Hexadecimal Value", filed on Jun. 16, 2006, which is herein incorporated by reference.

TECHNICAL FIELD

Embodiments of the present invention relate to connecting a handheld device to a wireless network, particularly in connecting a handheld device to an encrypted network.

BACKGROUND OF THE INVENTION

Handheld wireless communication devices are becoming multi-modal communication devices. These handheld devices are often hybrid devices which can communicate on a cellular network or on a wireless network, for example, a WiFi network. Wireless networks are often encrypted for security purposes. Encrypted networks often require an encryption key (e.g. WEP key) and an authentication process for the network to authenticate the device (or client) before the device is allowed to be connected to the network.

In the authentication process, a password is often encrypted and the encrypted version of the password is applied to an authentication protocol which is sent to the network for verification. A user is often required to specify the type of encryption for the password before the authentication process is initiated. Without the proper type of encryption, the authentication process will fail. Having to type a password multiple times using a mobile handheld device is inconvenient for the user. Furthermore, a user often does not know the type of encryption that is necessary to encrypt the password.

BRIEF DESCRIPTION OF THE DRAWINGS

The present invention is illustrated by way of example, and not by way of limitation, in the figures of the accompanying drawings and in which.

DETAILED DESCRIPTION

Figure 1:
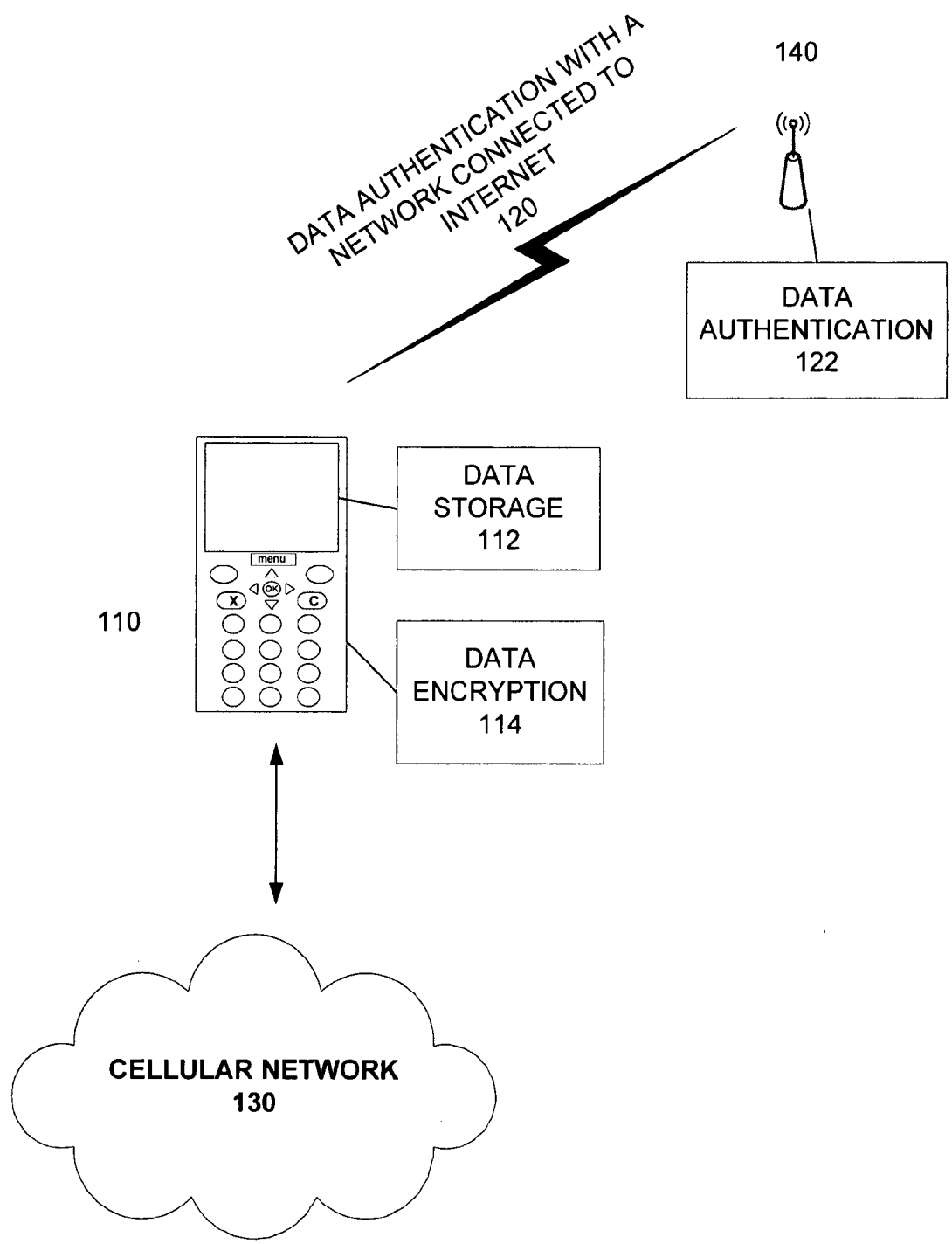
FIG. 1 illustrates a functional diagram of a handheld communication device in communication to different networks in accordance to one embodiment of the invention.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

A software module, or computer program product, may include a machine-readable medium having stored thereon instructions, which may be used to program a computer system (or other electronic devices) to perform a process. A machine-readable medium includes any mechanism for storing (machine-storage medium) or transmitting (machine-transmission medium) information in a form (e.g., software, processing application) readable by a machine (e.g., a computer). The machine-storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or other type of medium suitable for storing electronic instructions. Whereas, the machine-transmission medium may include, but is not limited to, electrical, optical, acoustical, or other form of propagated signal (e.g., carrier waves, infrared signals, digital signals, etc.).

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the method described herein may be implemented using computer software. If written in a programming language conforming to a recognized standard, sequences of instructions designed to implement the methods can be compiled for execution on a variety of hardware platforms and for interface to a variety of operating systems. In addition, embodiments of the present invention are not described with reference to any particular programming language. It will be appreciated that a variety of programming languages may be used to implement embodiments of the present invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms "handheld communication device", "handheld device", "client device", or "device" are used herein to refer to any handheld mobile communication device. This device may be a cellular phone, a hybrid cellular phone, a wireless handset or any mobile communication device that utilizes a wireless network. This device may also communicate voice, electronic data, or a combination of voice and electronic data with other devices which may not be connected to a wireless network, such as a telephone, a fax machine, or a computer etc. Furthermore, this handheld device may have the capability of performing computations such as running applications for web browsing and data processing abilities etc.

The term "wireless network" is herein used to define a network that uses at least radiowaves to transmit electronic data, voice data, or a combination of electronic and voice data. Wireless network may broadly include both secured and non-secured networks. In other words, a secure network may require authentication for an access point (AP) to verify that the client device is authorized to use the network before granting access for use. A non-secured network may not require any authentication prior to an access point granting use of a network to a client device. Wireless networks as defined may also include a cellular network, a 802.1×network, a WiFi network, and a WiMax network etc.

The terms "pass phrase", "pass word" are herein used to define a text word, a text phrase or any password that may be used by a user to log onto a secured wireless network. Such pass phrase is always stored on the client device, but it is encrypted by the client device, and it is the encrypted form of the pass phrase that is sent with data packets to the AP in an authentication protocol for the purposes of authenticating a device.

The terms "authentication protocol", "authentication application", "authentication algorithm" are herein used to define an application, a standard, an algorithm or a protocol etc., which may or may not be a known standard in the industry that is used to perform an authentication of a client device with a server on the network. The authentication algorithm may include WEP, RADIUS, PEAP, WPA, EAP-TLS etc. Such protocols and algorithms may or may not require the use of certificates for authentication, and may require an encrypted form of a pass phrase as a key in the authentication process between the client device and the server.

FIG. 1 illustrates a functional diagram of a handheld wireless mobile device in communication with different networks in accordance to one embodiment of the invention. A handheld device 110 contains a data storage 112 component and a data encryption 114 component. The data encryption component 114 may include, but not limited to, a component that encrypts a pass word or pass phrase and a component that uses the encrypted pass phrase to encode data packets in a process to authenticate a client device in a secured network. In one embodiment, the handheld device 110 may be a hybrid device that is configured to both interact with a cellular network 130 and a wireless access point (AP) 140. The AP may represent a server that resides on the network. As described, in a case where the network is encrypted, the process 120 of authenticating the device 110 with the server or AP 140 is carried out. In particular, data authentication 122 may take place at the server 140. In another embodiment, the data authentication may also take place at the handheld device 110 and the server 140.

In one embodiment, the handheld wireless mobile device 110 may be a multi-modal communication device configured for voice calls, instant messaging (IM), emails, and having web browsing capabilities. This handheld device may use any wireless network for communicating information. In this embodiment, in an authentication process 120 a pass word or pass phrase entered by a user is encrypted into a key, which is further used in an authentication protocol for verifying or confirming the device with the AP. The authentication process 120 is performed without requiring the user to enter any data except a password or pass phrase. Hence, the user's involvement and efforts in the authentication process are minimized, vastly improving the user experience in logging onto an encrypted network using a handheld mobile device.

Figure 2:
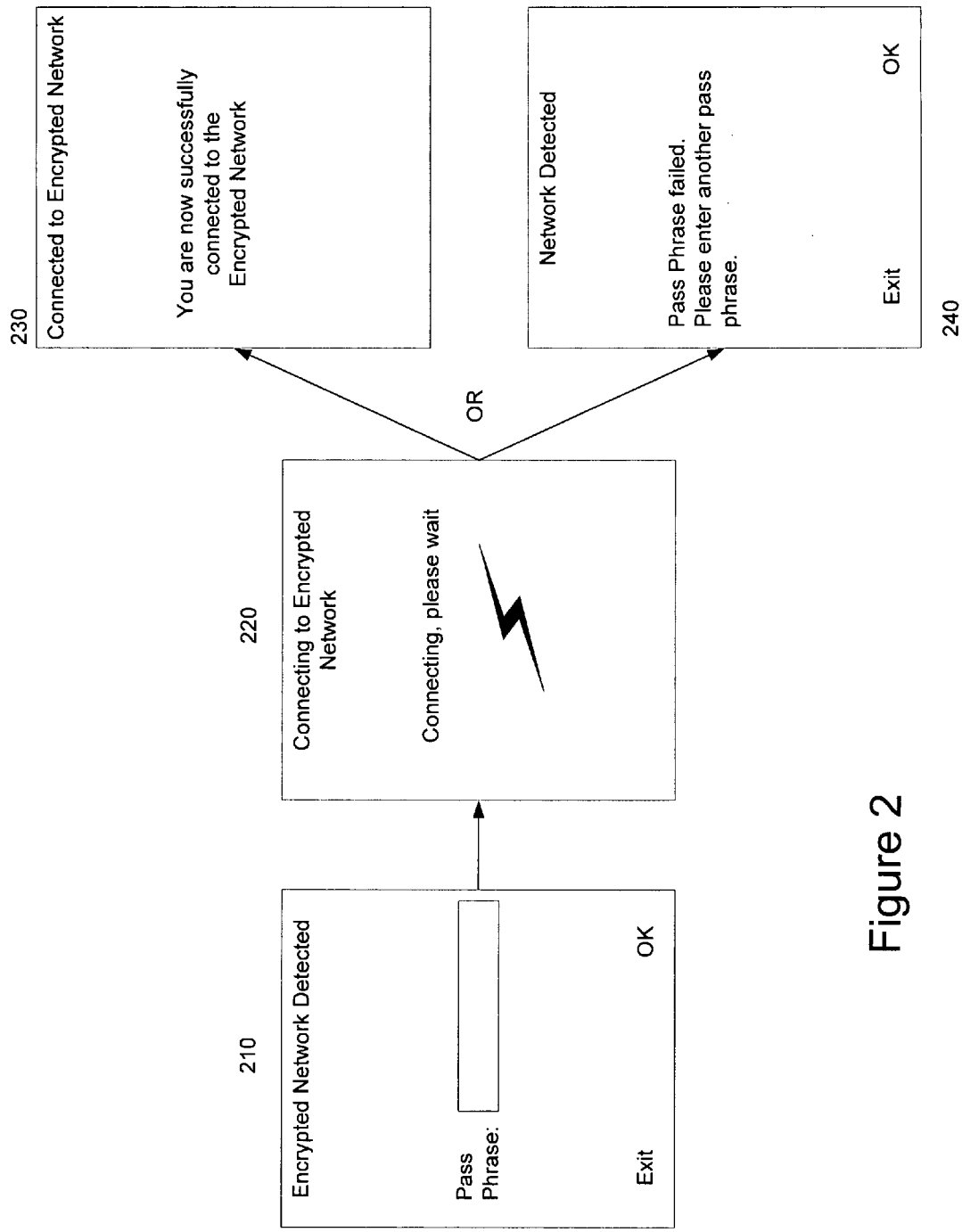
FIG. 2 illustrates a user interface of a handheld communication device as seen by a user in the authentication process in accordance to an embodiment of the invention.

FIG. 2 illustrates a user interface of a handheld communication device provided by the authentication process, in accordance to an embodiment of the invention. In one embodiment, a handheld device automatically detects if a wireless network is present. Once a wireless network is detected, if no encryption is needed, the handheld device will automatically connect to the wireless network. However, if a wireless network requires encryption, the handheld device will prompt the user for a pass phrase as in 210. In a different embodiment, if required by the server of the network, a user name and/or domain name (not shown) may also be requested by the handheld device. Once the pass word or pass phrase is received by the handheld device, the user interface will display to the user that it is in the process of connecting to the encrypted network, as shown in 220. In fact, during 220, the device will encrypt the pass phrase or pass word into an encrypted key (e.g., WEP key) and proceed with the authentication of the handheld device to a server on the network using the encrypted pass phrase or pass word. If the authentication is successful, the handheld device will be connected to the network and the handheld device will display and notify the user that the device is successfully connected to the encrypted network as in 230. If the authentication fails, the handheld device will indicate to the user on the display that the pass phrase failed and request another pass phrase from the user as shown in 240.

Although transparent to the user, the above authentication process involves a scheme that tries multiple encryption methods on the pass phrase to determine which one is applicable for the authentication protocol. If a first method fails, a second method is tried, until all methods are exhausted. If and when all methods are exhausted, the device will indicate to the user that the pass phrase is incorrect and thus prompting the user for a different pass phrase or pass word. In a different embodiment, in addition to the ability to vary encryptions of the pass phrase, the device may also be able to interact with the server on a network to determine and implement different authentication protocols. For instance, if one authentication protocol is not accepted by the server, another authentication protocol will be attempted. In one embodiment, the encryption of the pass phrase and the implementation of an authentication protocol are two processes operating separately. In another embodiment, they are combined into a single process.

Embodiments of the present invention provide several advantages. First, a user is not prompted to choose between what type of encryption is necessary for the pass phrase. In one embodiment, typically a pass phrase entered by a user is in the form of ASCII text and so a device needs to go through another step to automatically determine what type of encryption to apply to the pass phrase into the proper encrypted key (e.g., WEP key) that is used by the authentication protocol. Generally, this form of encryption has to be specified by the user so the device understands what type of encryption is necessary. Depending on the required encryption, the ASCII text may need to be converted into a hexadecimal value or the ASCII text may need to be translated into a string value. Thus one of the benefits is that an algorithm will automatically perform the encryption for a user such that the user needs only to enter an easy to remember pass phrase or pass word and need not remember the pass phrase or pass word in a hexadecimal or some other form. Further, this also does not require the user to specify the type of encryption for the pass word or pass phrase.

Another advantage is that this generally saves numerous key strokes to be used by a user. Once a pass phrase is used correctly to log onto a particular secured network, being in the presence of the secured network in the future, the pass phrase is automatically remembered and a user does not have to re-type or re-enter the pass phrase to log into the secured network. Therefore, this algorithm implemented in the handheld device reduces a user's involvement in the pass phrase encryption process, automatically tries and uses multiple encryption methods to encrypt the pass phrase into a format useable by an authentication protocol, and saves key strokes to make the process more efficient and to enhance user experience.

It should be appreciated that the process described is performed on the client device and does not require any assistance from the server on the network. In other words, the process of trying different encryption methods to encrypt a pass phrase is performed solely on the client device or the handheld device and does not rely upon any server response to implement.

Figure 3:
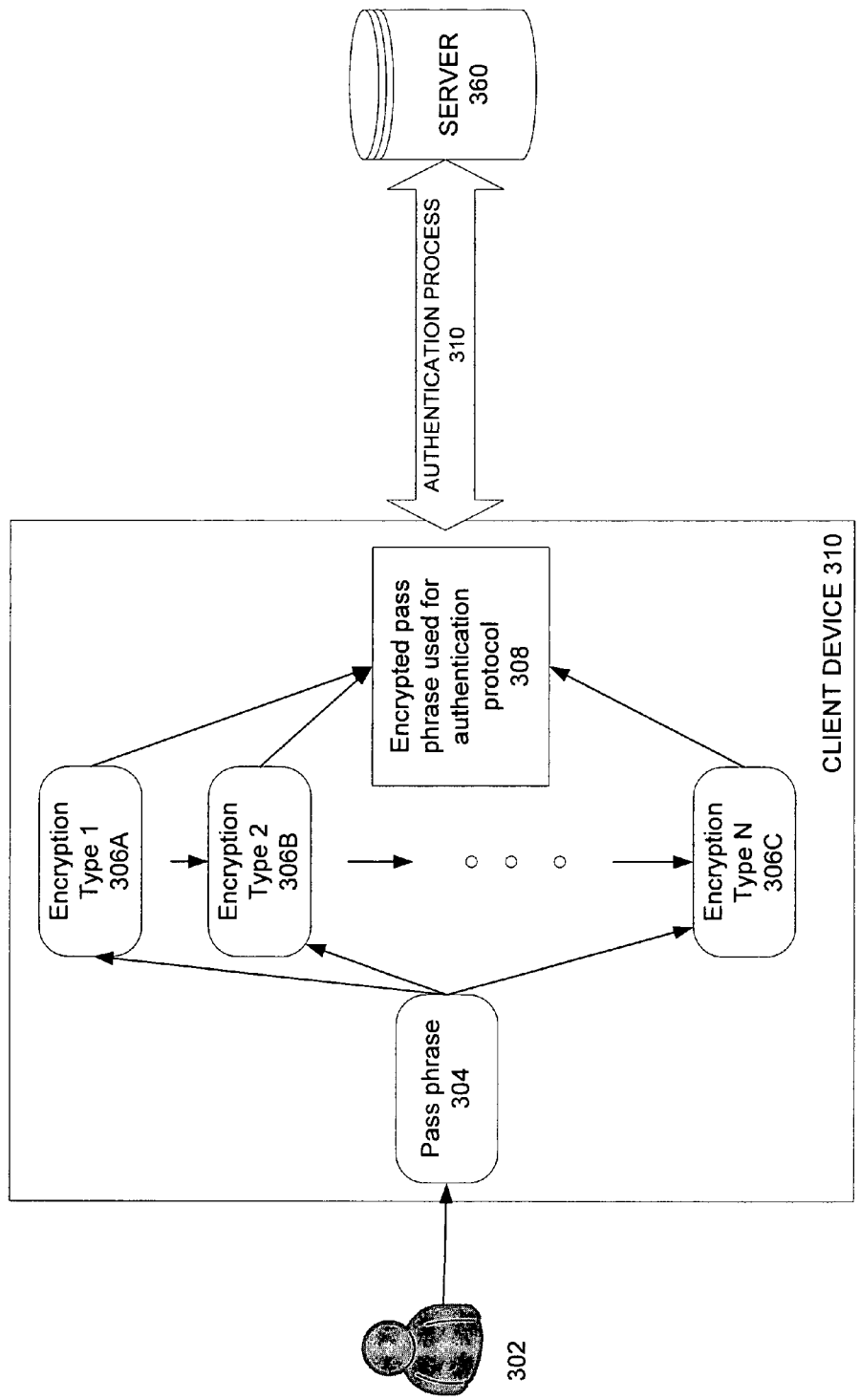
FIG. 3 illustrates a functional block diagram of the interaction of a client device with a user and a server controlling a network in an authentication process in accordance to an embodiment of the invention.

FIG. 3 illustrates a functional block diagram of the interaction of a client device with a user and a server controlling a network in an authentication process in accordance to an embodiment of the invention. In one embodiment, as shown in FIG. 3, a user 302 enters a pass phrase 303 into a client device 310. The client device 310 hosts an algorithm that encrypts the pass phrase for authentication. The algorithm will try encryption type 1 306A of the pass phrase, and if that fails, the algorithm will try encryption type 2 306B of the pass phrase, and so forth, until the last available encryption type N 306C has been tried or an appropriate one is found. If an encryption type succeeds, the result, which is the encrypted pass phrase used for authentication protocol 308, will be applied in the authentication protocol for the authentication process 310. This authentication process is performed in conjunction with the server 360 of the network.

In one embodiment, the entire pass phrase encryption process is separate from the authentication process. The pass phrase encryption process is entirely performed within the client device and does not involve the server on the network. In other words, the pass phrase encryption process does not rely upon the authentication protocol and does not require a response from the server to perform.

While it is not shown in FIG. 3, the client device may attempt different authentication protocols for different networks in case different networks use different authentication protocols. The client device 310 may be programmed to work with the server 360 so that the latter will send a response to the former if a different authentication protocol should be used. Further, in another embodiment, the server 360 may send a request demanding a specific authentication protocol. In yet another embodiment, the server 360 may not send any response or request, and the client device will simply cycle through the different authentication protocols available (e.g., in a trial and error manner) until an authentication protocol used by the server is found.

Figure 4:
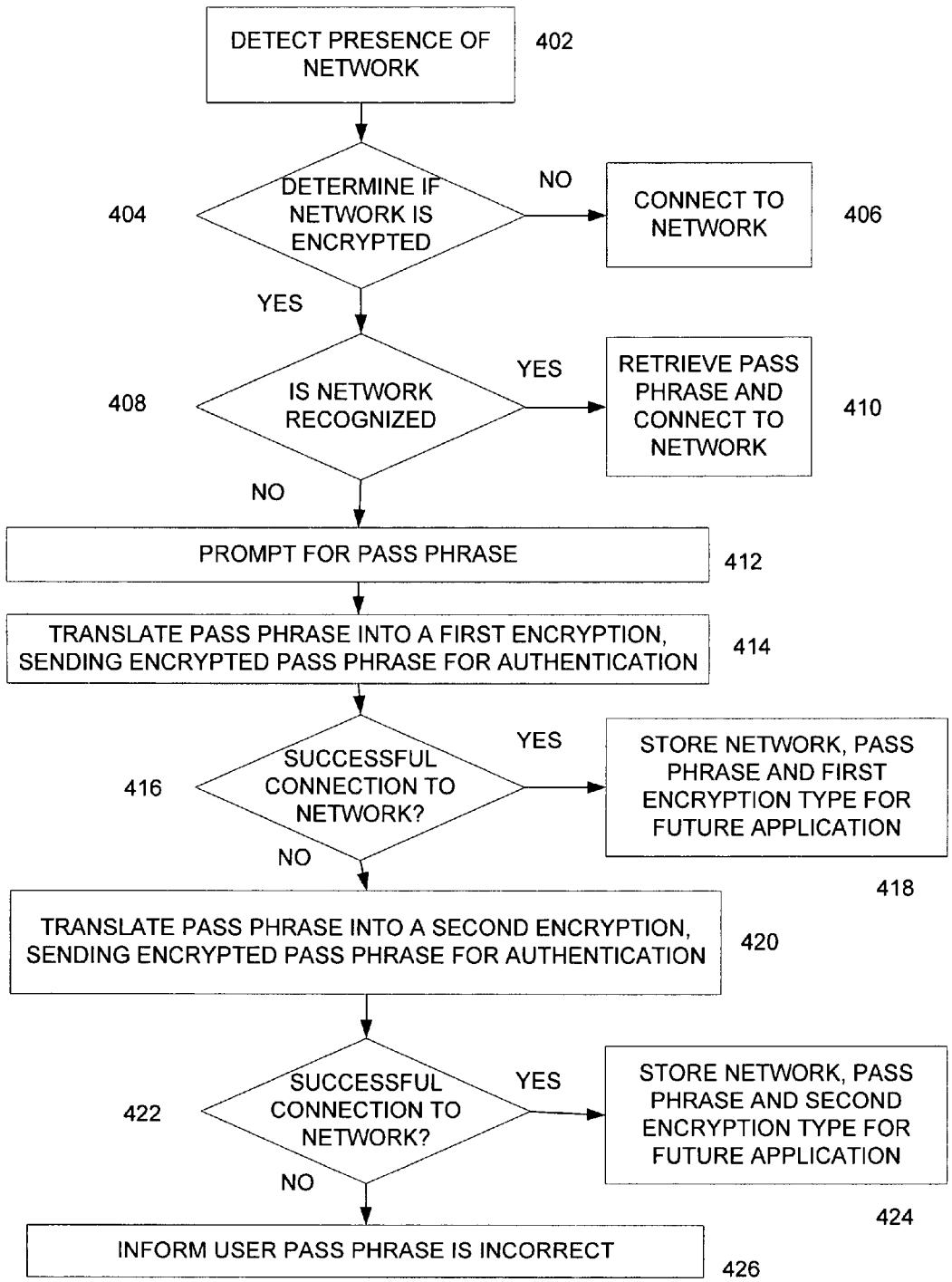
FIG. 4 illustrates a flow diagram of the automatic detection process in accordance to an embodiment of the invention.

FIG. 4 illustrates a flow diagram of the automatic detection process in accordance to an embodiment of the invention. The process may be performed by processing logic that may comprise hardware (e.g., circuitry, dedicated logic, etc.), software (such as run on a general purpose computer system or a dedicated machine), or a combination of both. In one embodiment, processing logic resides in a mobile device (e.g., mobile device 110 of FIG. 1).

At block 402, processing logic detects a presence of a network. In one embodiment, processing logic automatically detects the presence of networks and may automatically prioritize and log onto one type of network over another. For example, processing logic may prefer a free wireless network over a cellular network if the latter involves charges when data and phone calls are made, while the former may not. In another embodiment, a user may enter in a request to the client device to search for presence of a network.

Upon detecting a network, processing logic determines if the network is encrypted (block 404). In one embodiment, if the network is not encrypted, the client device will automatically connect to the network as shown in block 406. In another embodiment, if the network is encrypted, processing logic further determines whether the network is recognized as in block 408. If the network is recognized, in one embodiment, processing logic automatically retrieves a previous pass phrase or password and retrieves the type of encryption that has been successfully used as in block 410. Processing logic applies the retrieved encryption to the retrieved pass phrase to connect to the network. In another embodiment (not shown), processing logic may prompt the user to receive a confirmation before applying the retrieved encryption type to the retrieved pass phrase to connect to the network.

However, if the network is not recognized as in block 408, processing logic prompts the user for a pass phrase as in block 412, and in other embodiments (not shown), may also prompt the user for a user name, domain name, etc. Upon receiving the inputs from a user of the pass phrase, processing logic automatically translates the pass phrase into a first encryption type as shown in block 314 and then sends the encrypted pass phrase for authentication and to connect to the network as in block 316. If the connection to the network is successful, processing logic stores the signature of the network, the pass phrase, and the encryption type, associating the three together for future application as shown in block 318. If the connection to the network fails, processing logic translates the pass phrase using a second encryption and then using the encrypted pass phrase in the same authentication protocol to connect to the server on the network, as in block 320. If the connection to the network succeeds, processing logic stores the signature of the network, the pass phrase, and the encryption type, associating the three for future application as in block 324. However, if the connection to the network fails again, processing logic informs the user that the pass phrase is incorrect and prompts the user to enter a different pass phrase or pass word.

It should be noted that, in one embodiment, the above algorithm tries different encryption types for a single authentication protocol. In other words, the authentication protocol remains constant, while the encryption of the pass phrase varies.

Figure 5:
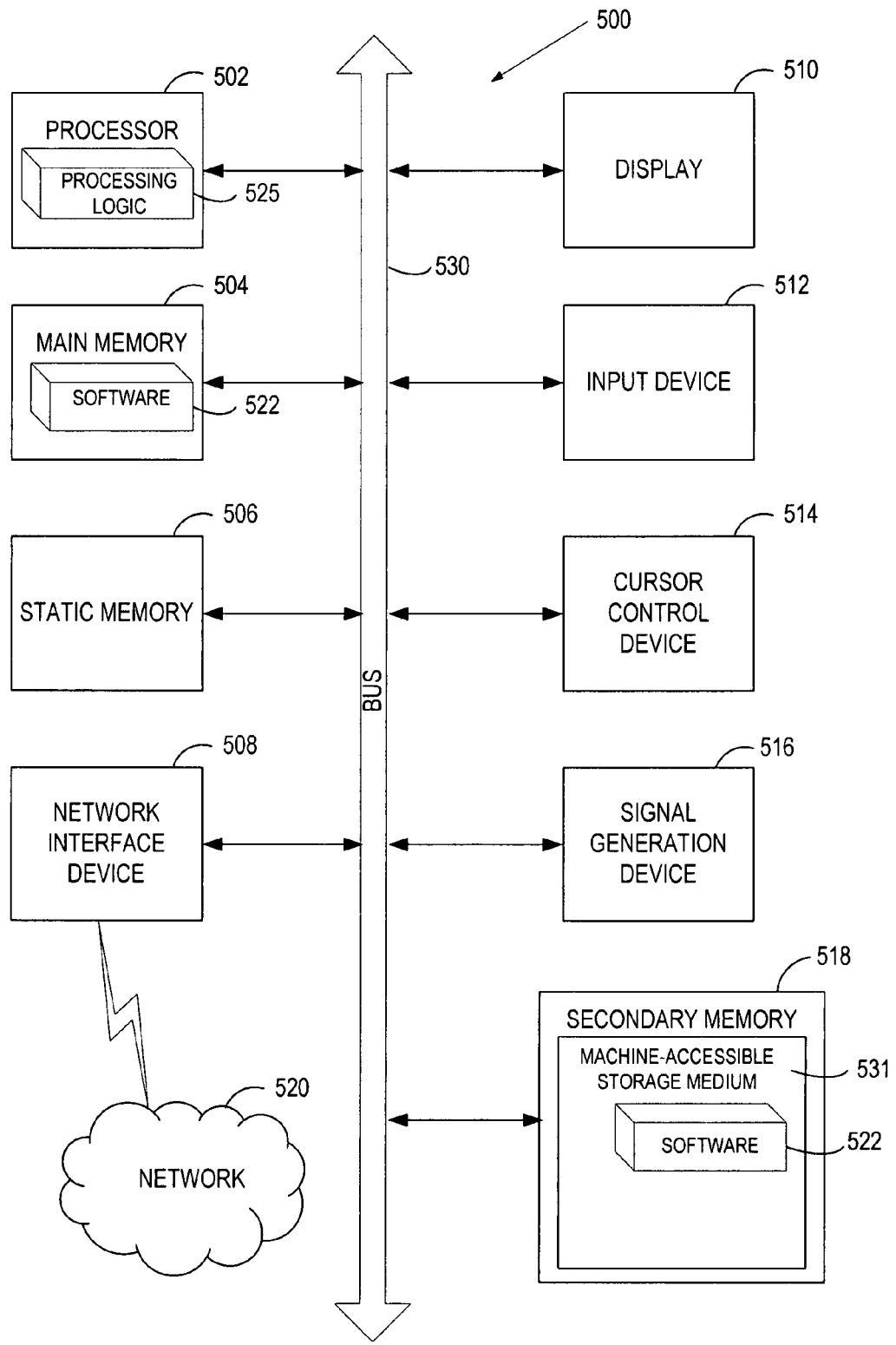
FIG. 5 illustrates a functional block diagram of a computing device adapted to implement an embodiment of the invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, a wireless network, a cellular network or the Internet. The machine may operate in the capacity of a server or a client machine in a client-server network environment, or as a peer machine in a peer-to-peer (or distributed) network environment. The machine may be a personal computer (PC), a tablet PC, a Personal Digital Assistant (PDA), a cellular telephone, a multi-modal communication device (MMCD) a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instructions set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like, The processor 502 is configured to execute the processing logic 525 for performing the operations and the steps discussed therein.

The computer system 500 may further include a network interface device 508. The computer system 500 also may include a video display unit 510 (e.g., a liquid crystal display (LCD) or a plasma display or a display comprising light emitting diodes (LED)), an input device 512 (e.g., a keypad, key board, soft keys, microphone), a cursor control device 514 (e.g., a mouse, a joystick), and a signal generation device 519 (e.g., a speaker).

The data storage device 518 may include a machine-accessible storage storage medium 531 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-accessible storage media. The software 522 may further be transmitted or received over a network 520 via the network interface device 508.

The machine-accessible storage medium 531 may also be used to store data structure sets that define user identifying states and user preferences that define user profiles. Data structure sets and user profiles may also be stored in other sections of computer system 500, such as static memory 506.

While the machine-accessible storage medium 531 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, and optical and magnetic media, but not to include machine-accessible transitional medium which may include carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    prompting a user for a pass phrase to connect an apparatus comprising at least one processor to a network, wherein the apparatus is a hybrid wireless communication device configured to transmit and receive electronic information including phone calls through a cellular network and a WiFi network; and wherein the network is an encrypted WiFi network and the pass phrase is encrypted into a WEP key to connect to the encrypted WiFi network;
    receiving the pass phrase;
    determining, automatically, by the at least one processor, a type of encryption for the pass phrase to connect to the network;
    causing, at least in part, authentication of the apparatus using the type of encryption determined for the pass phrase,
    wherein the determination of the type of encryption includes encrypting, automatically, the pass phrase based on each available encryption type from a plurality of available encryption types, prior to attempting authentication of the apparatus by using each respective encrypted pass phrase; and
    if connecting to the encrypted WiFi network using the WEP key fails, encrypting, automatically, the pass phrase into a hexadecimal value to connect to the encrypted WiFi network.

2. The method of claim 1, wherein the wireless communication device is configured to store and to associate the pass phrase to the encrypted WiFi network.

3. The method of claim 2, wherein the wireless communication device automatically connects to the WiFi network using the pass phrase when presence of the WiFi network is detected.

4. The method of claim 1, wherein the pass phrase is a string of alphanumeric characters.

5. The method of claim 1, wherein the prompting is an automatic response to detecting the network which requires an encryption key.

6. A non-transitory computer readable storage medium carrying one or more sequences of one or more instructions which, when executed by one or more processors, cause an apparatus to at least perform the following steps:
    prompting a user for a pass phrase to connect the apparatus to a network, wherein the apparatus is a hybrid wireless communication device configured to transmit and receive electronic information including phone calls through a cellular network and a WiFi network, wherein the network is an encrypted WiFi network and the pass phrase is encrypted into a WEP key to connect to the encrypted WiFi network;

receiving the pass phrase;

determining, automatically, a type of encryption for the pass phrase to connect to the network;

causing, at least in part, authentication of the apparatus using the type of encryption determined for the pass phrase, wherein the determination of the type of encryption includes encrypting, automatically, the pass phrase based on each available encryption type from a plurality of available encryption types, prior to attempting authentication of the apparatus by using each respective encrypted pass phrase; and if connecting to the encrypted WiFi network using the WEP key fails, encrypting, automatically, the pass phrase into a hexadecimal value to connect to the encrypted WiFi network.

7. The non-transitory computer readable storage medium of claim 6, wherein the wireless communication device is configured to store and to associate the pass phrase to the encrypted WiFi network.

8. The non-transitory computer readable storage medium of claim 7, wherein the wireless communication device automatically connects to the WiFi network using the pass phrase when presence of the WiFi network is detected.

9. The non-transitory computer readable storage medium of claim 6, wherein the pass phrase is a string of alphanumeric characters.

10. The non-transitory computer readable storage medium of claim 6, wherein the prompting is an automatic response to detecting the network which requires an encryption key.

11. An apparatus comprising:
at least one processor; and
at least one memory including computer program code, the at least one memory and the computer program code configured to, with the at least one processor, cause the apparatus to perform at least the following wherein the apparatus is a hybrid wireless communication device configured to transmit and receive electronic information including phone calls through a cellular network and a WiFi network:

prompt a user for a pass phrase to connect the apparatus to a network, and to receive the pass phrase;

determine, automatically, a type of encryption for the pass phrase to connect to the network, and cause, at least in part, authentication of the apparatus, wherein the determination of the type of encryption includes encrypting, automatically, the pass phrase based on every available encryption type from a plurality of available encryption types, prior to attempting authentication of the apparatus by using each respective encrypted pass phrase, wherein the network is an encrypted WiFi network and the pass phrase is encrypted into a WEP key to connect to the encrypted WiFi network; and if connecting to the encrypted WiFi network using the WEP key fails, encrypting, automatically, the pass phrase into a hexadecimal value to connect to the encrypted WiFi network.

12. The apparatus of claim 11, wherein the wireless communication device is configured to store and to associate the pass phrase to the encrypted WiFi network.

13. The apparatus of claim 12, wherein the wireless communication device automatically connects to the WiFi network using the pass phrase when presence of the WiFi network is detected.

14. The apparatus of claim 11, wherein the prompt is an automatic response to detecting the network which requires an encryption key.

* * * * *